United States Patent [19]

Branham

[11] Patent Number: 5,794,805
[45] Date of Patent: Aug. 18, 1998

[54] FUEL TANK ASSEMBLY FOR SKID STEER LOADERS

[75] Inventor: Douglas G. Branham, Leola, Pa.

[73] Assignee: New Holland North America Inc., New Holland, Pa.

[21] Appl. No.: 732,954

[22] Filed: Oct. 17, 1996

Related U.S. Application Data

[63] Continuation of Ser. No. 339,054, Nov. 14, 1994, abandoned.

[51] Int. Cl.⁶ ................................................. B65D 25/20
[52] U.S. Cl. ................................ 220/86.2; 220/562
[58] Field of Search ............................ 220/86.1–86.4

[56] References Cited

U.S. PATENT DOCUMENTS

| 1,654,840 | 4/1928 | Malluk | 220/86.2 X |
| 2,466,076 | 4/1949 | Bentley et al. | 220/86.2 |
| 2,576,192 | 11/1951 | Poznik | 220/86.2 |
| 2,779,498 | 1/1957 | Cole et al. | 220/86.2 |
| 3,330,439 | 7/1967 | Moorman | 220/86.2 |
| 3,435,896 | 4/1969 | Williams | 220/86.1 X |
| 4,462,620 | 7/1984 | Bambenek et al. | 220/86.2 X |
| 4,718,568 | 1/1988 | Dal Palu | 220/86.2 |
| 4,759,459 | 7/1988 | Bailey et al. | 220/86.2 |
| 4,883,103 | 11/1989 | Szlaga et al. | 220/86.2 X |
| 5,111,858 | 5/1992 | Aittama et al. | 220/86.2 X |
| 5,253,773 | 10/1993 | Choma et al. | 220/86.2 |
| 5,261,700 | 11/1993 | Martenas et al. | 220/86.2 X |

FOREIGN PATENT DOCUMENTS

| 2657747 | 6/1978 | Germany | 220/86.2 |
| 507026 | 6/1939 | United Kingdom | 220/86.2 |

*Primary Examiner*—Sue A. Weaver
*Attorney, Agent, or Firm*—J. William Stader; Larry W. Miller; Frank A. Seemar

[57] ABSTRACT

Rotationally molded component parts for a skid steer loader are disclosed wherein the parts provide specialized operative functions heretofore unrealized. A fuel tank structure includes both a tank body and a separate filler tube formed from a rotational molding process. The filler tube is connected to the fuel tank body by a fastening mechanism and an O-ring to provide a liquid-tight connection. The coolant recovery bottle formed with the rotational molding process incorporates an inwardly directed vent tube formed as an integral part of the recovery bottle. The container for the operator's manual is formed with the rotational molding process to incorporate a live hinge connecting a lid closable against the body of the container to provide a substantially dirt-free environment. Double walled light housings mounting front and rear lights serve as bumpers protecting the frame of the skid steer loader from damage from impact. The hydraulic reservoir tank is formed with a kiss-off structure interconnecting the opposing lateral sides of the reservoir tank to add strength and maintain integrity.

3 Claims, 20 Drawing Sheets

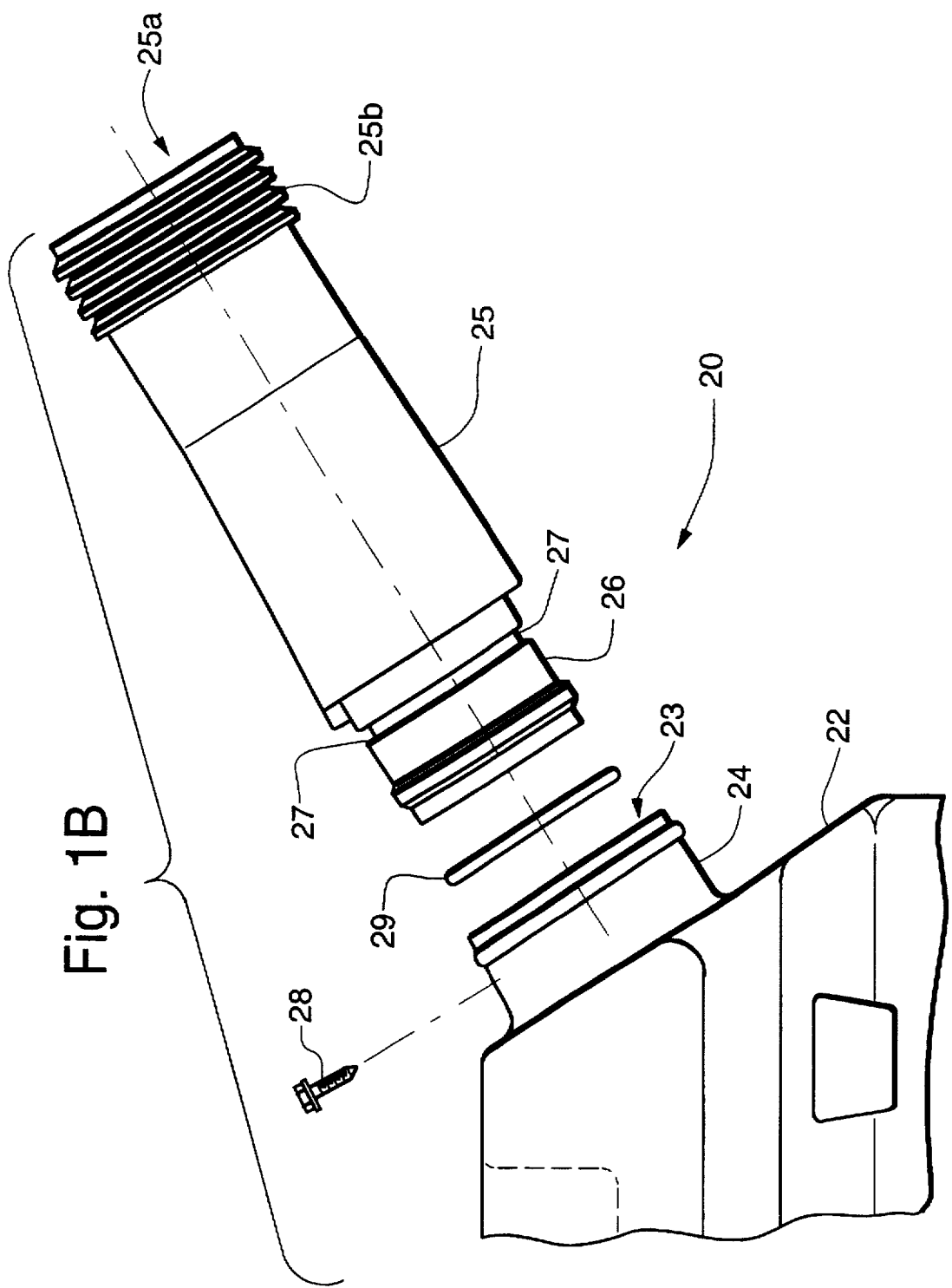

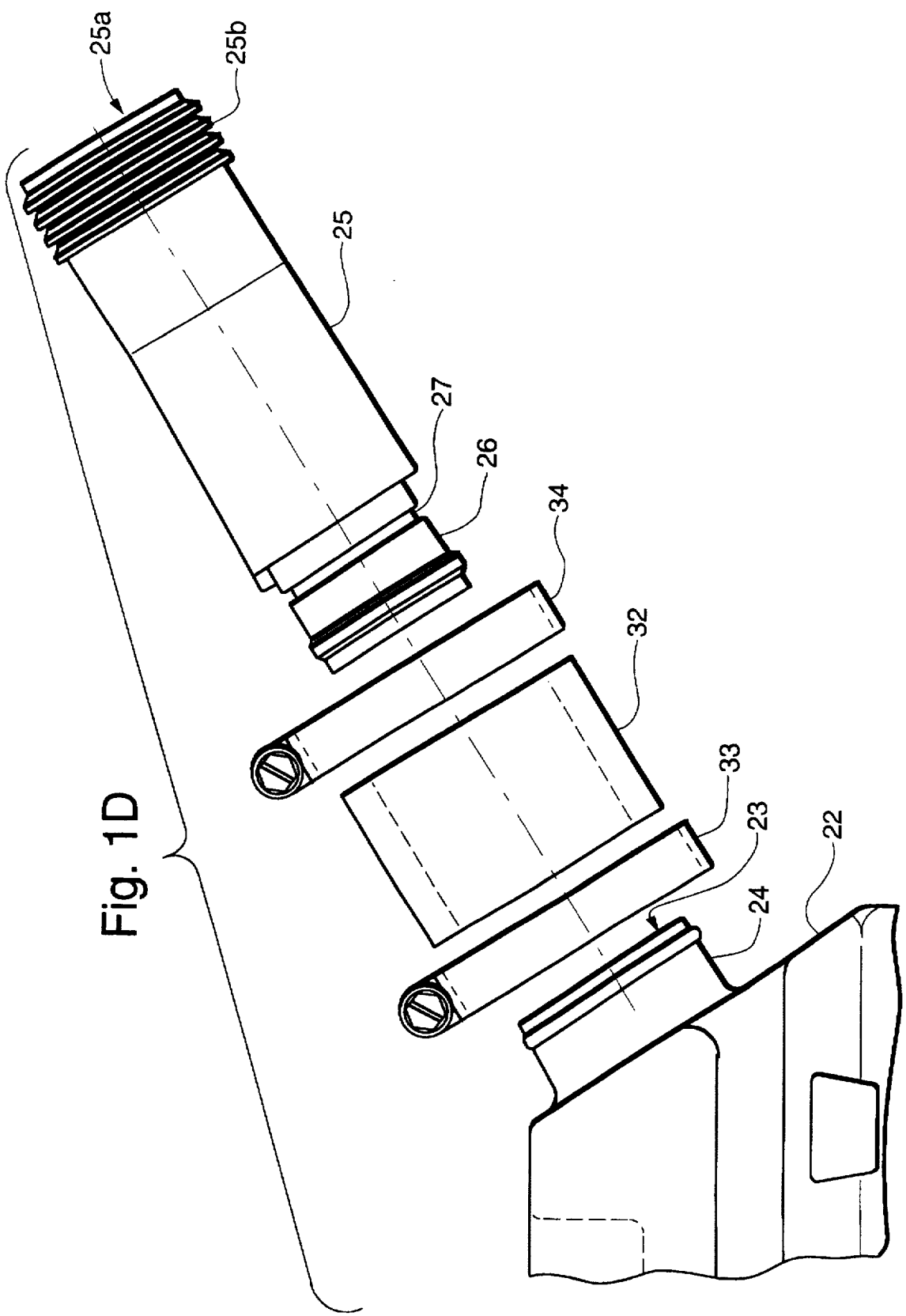

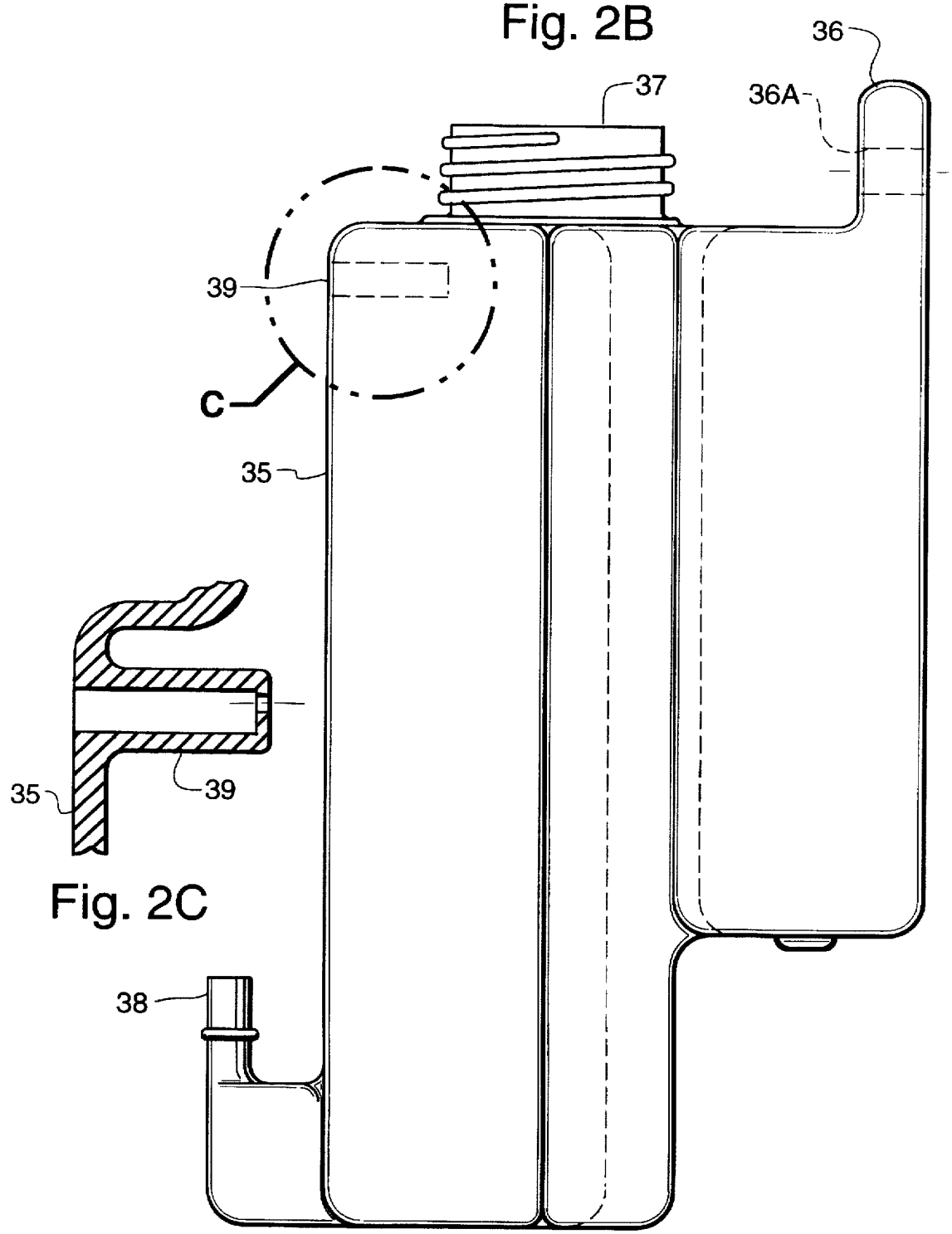

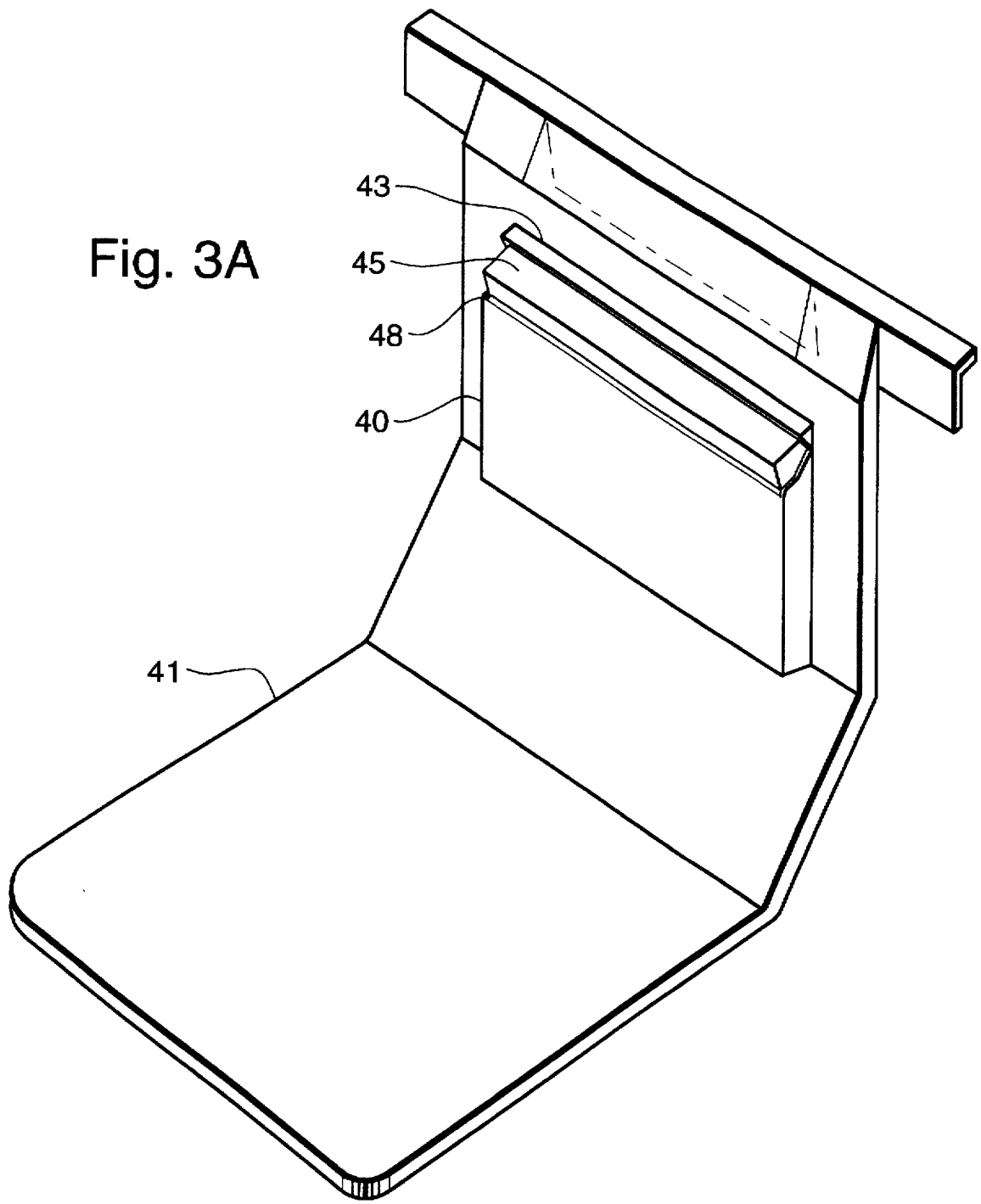

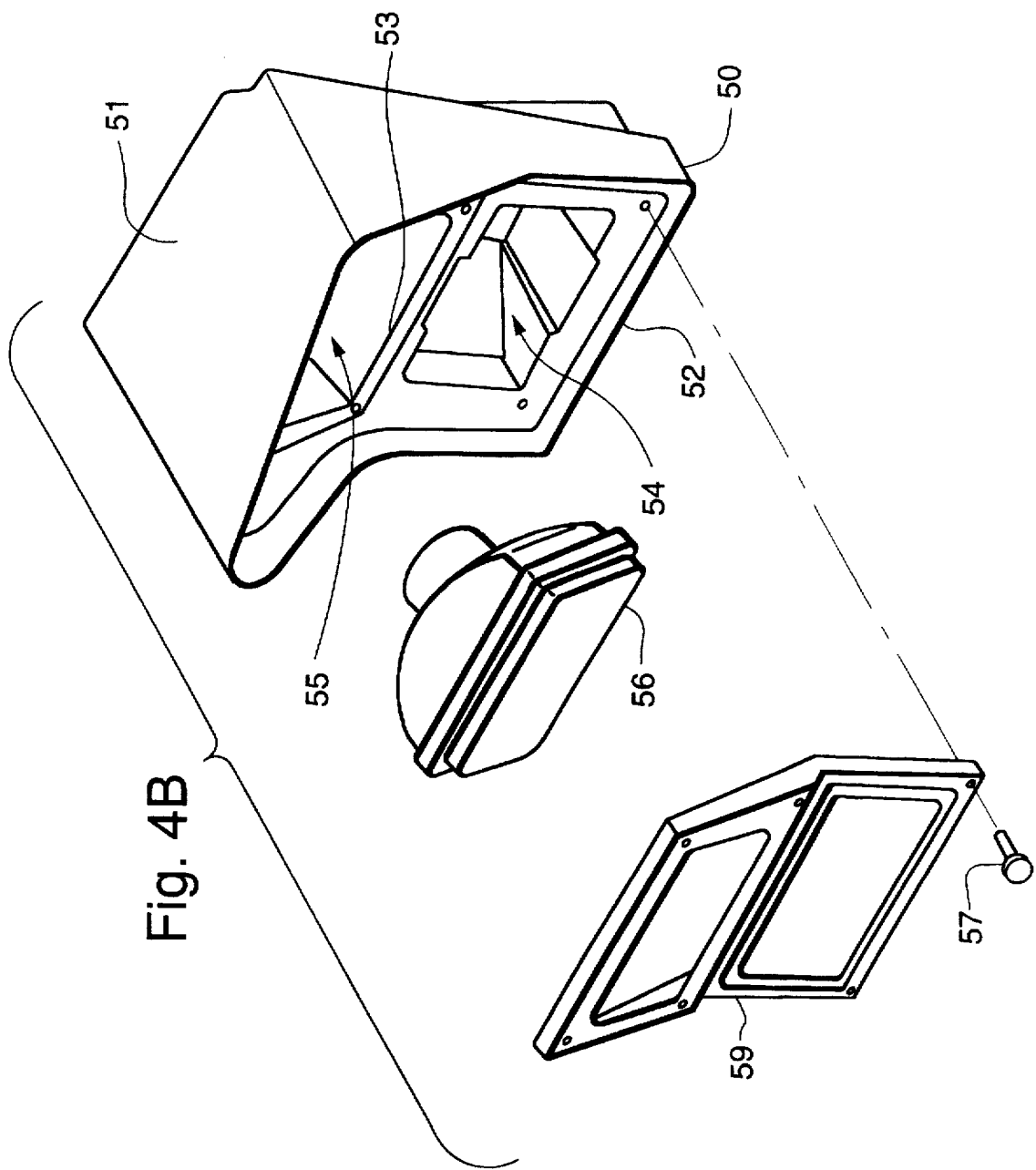

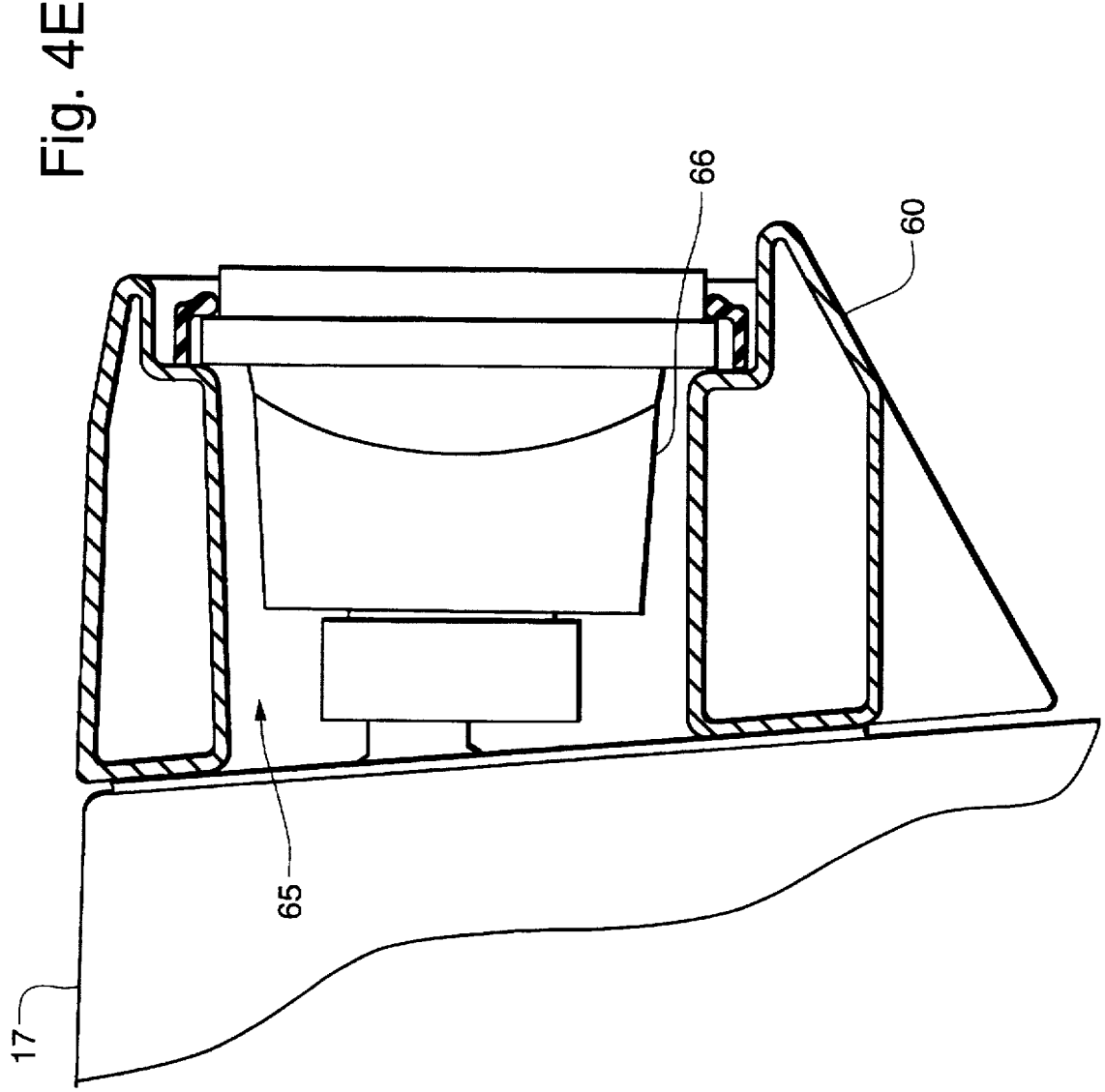

FUEL TANK ASSEMBLY FOR SKID STEER LOADERS

This is application is a continuation of application Ser. No. 08/339,054, filed Nov. 14, 1994, now abandoned.

BACKGROUND OF THE INVENTION

This invention relates generally to the creation of non-metallic parts for use on off-road vehicles, and, more particularly, to components formed by a rotational molding process to form component parts suitable for use on skid steer loaders.

Rotational molding is a known process used for manufacturing plastic components by first creating a mold formed in the shape of the component to be formed, and then pouring a suitable quantity of powdered polyethylene resin into the mold, after which the mold is closed, heated to about 600° F. and slowly rotated for approximately 10 minutes to evenly distribute the resin to the periphery of the mold. The heating process converts the powdered resin into an integral plastic sheeting, having a generally uniform thickness conforming to the shape of the mold. The material thickness of the component part being formed is dependent on the amount of resin material first poured into the mold. By precise formation of the mold and careful calculation of the amount of resin to be applied, a generally hollow polymer component can be formed from this process.

The rotational molding process has not been traditionally used in constructing parts for off-road vehicles. Such component parts have typically been cast of metal or formed from sheet metal to provide the desired durability and function. Nevertheless, rotationally molded components are manufactured with significantly less cost that corresponding metallic parts and contain significantly less weight. Furthermore, the function of metallic components have heretofore not been capable of being duplicated, such as providing hinged closures, liquid-tight connections, vent tubes and high strength, large volume liquid-tight vessels.

Accordingly, it would be highly desirable to provide a means for constructing rotationally molded components to provide live hinges, liquid tight connections, vessels with splash-proof vent tubes and kiss-offs in large volume liquid-tight vessels to improve the lateral strength thereof to permit the use of such components in specialty areas on skid steer loaders.

SUMMARY OF THE INVENTION

It is an object of this invention to overcome the aforementioned disadvantages of the prior art by providing rotationally molded components for skid steer loader construction.

It is another object of this invention to provide a rotationally molded fuel tank for a skid steer loader.

It is a feature of this invention that the filler tube and the fuel tank body can be rotationally molded as separate components and assembled in a liquid-tight manner.

It is an advantage of this invention that the connection between the filler tube and the rotationally molded fuel tank will not leak fuel externally of the fuel tank.

It is another object of this invention to provide a rotationally molded coolant recovery bottle for use on a skid steer loader.

It is another feature of this invention that the coolant recovery bottle is provided with a vent tube integrally formed into the body of the vessel.

It is another advantage of this invention that the vent tube for the rotationally molded coolant recovery bottle is substantially splash-proof.

It is still another object of this invention that the operator's manual storage container for a skid steer loader can be rotationally molded.

It is still another feature of this invention that the operator's manual storage container includes a lid connected to the body of the container by a live hinge formed during the rotational molding process.

It is still another advantage of this invention that the lid of the rotationally molded operator's manual storage container closes against the body of the container to provide a substantially clean environment for the storage of the operator's manual.

It is yet another object of this invention to provide a double walled light housing for both the front and rear lights of a skid steer loader.

It is yet another feature of this invention that the double walled light housings serve as a bumper to absorb damage to protect the metallic frame of the skid steer loader during appropriate impacts.

It is yet another advantage of this invention that the front and rear lights can be mounted in the light housings and retained by a standard bezel.

It is a further object of this invention to provide a large volume hydraulic reservoir tank for a skid steer loader that is formed from a rotational molding process.

It is a further feature of this invention that the hydraulic reservoir tank is formed with a kiss-off interconnecting the two opposing lateral sides of the tank to increase the strength of the tank body and prevent bulging of the sides of the tank due to the volume of hydraulic fluid contained therein.

It is a further advantage of this invention that the hydraulic reservoir tank can be formed with substantially large lateral sides co-joined by an internal kiss-off structure to maintain the integrity of the tank when utilized in a relatively confined space on a skid steer loader.

It is yet a further object of this invention to provide rotationally molded component parts for a skid steer loader which is durable in construction, inexpensive of manufacture, carefree of maintenance, facile in assemblage, and simple and effective in use.

These and other objects, features and advantages are accomplished according to the instant invention by providing rotationally molded component parts for a skid steer loader wherein the parts provide specialized operative functions heretofore unrealized. A fuel tank structure includes both a tank body and a separate filler tube formed from a rotational molding process. The filler tube is connected to the fuel tank body by a fastening mechanism and an O-ring to provide a liquid-tight connection. The coolant recovery bottle formed with the rotational molding process incorporates an inwardly directed vent tube formed as an integral part of the recovery bottle. The container for the operator's manual is formed with the rotational molding process to incorporate a live hinge connecting a lid closable against the body of the container to provide a substantially dirt-free environment. Double walled light housings mounting front and rear lights serve as bumpers protecting the frame of the skid steer loader from damage from impact. The hydraulic reservoir tank is formed with a kiss-off structure interconnecting the opposing lateral sides of the reservoir tank to add strength and maintain integrity.

BRIEF DESCRIPTION OF THE DRAWINGS

The advantages of this invention will be apparent upon consideration of the following detailed disclosure of the

Figure 1:
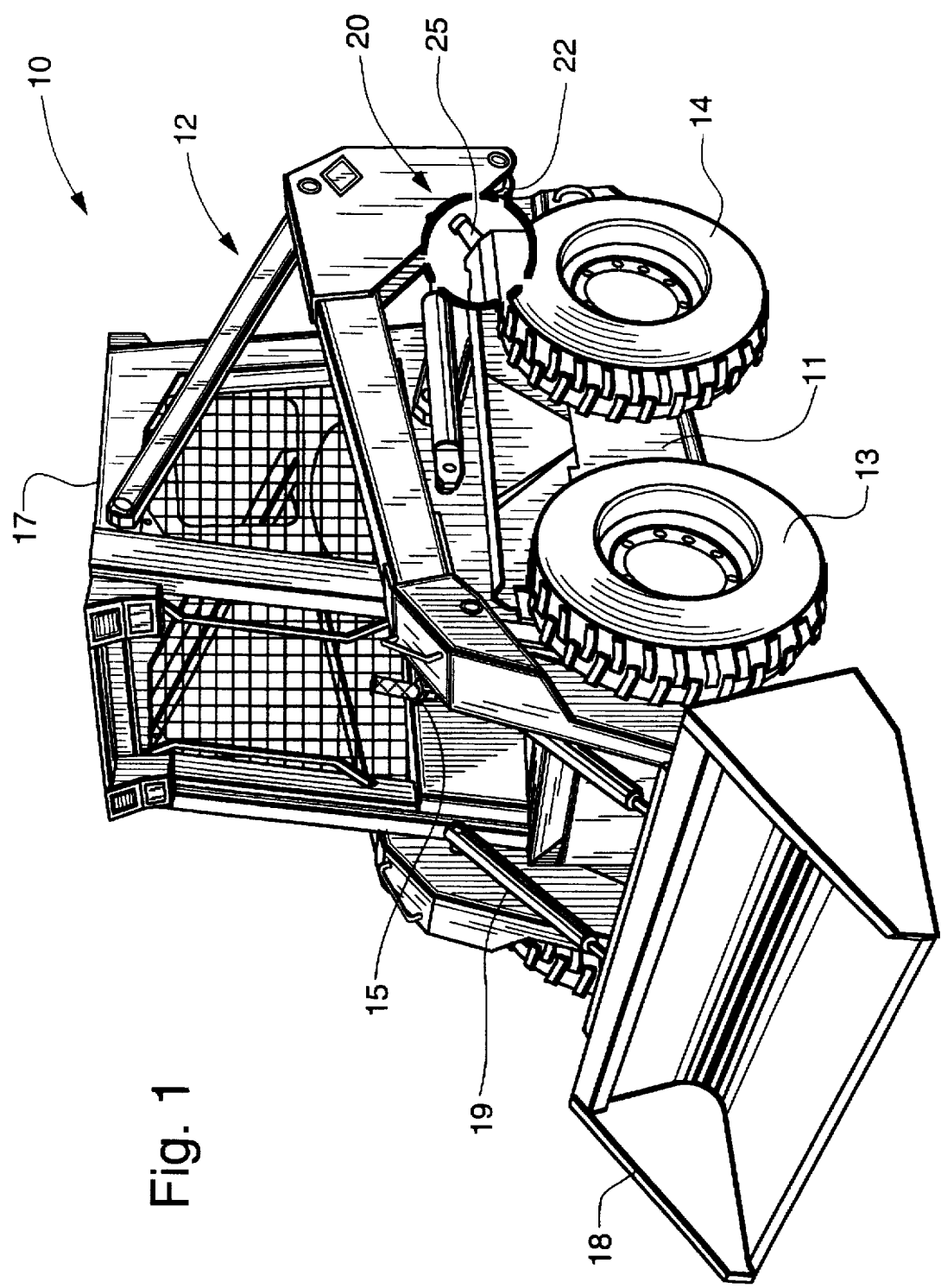
Figure 1A:
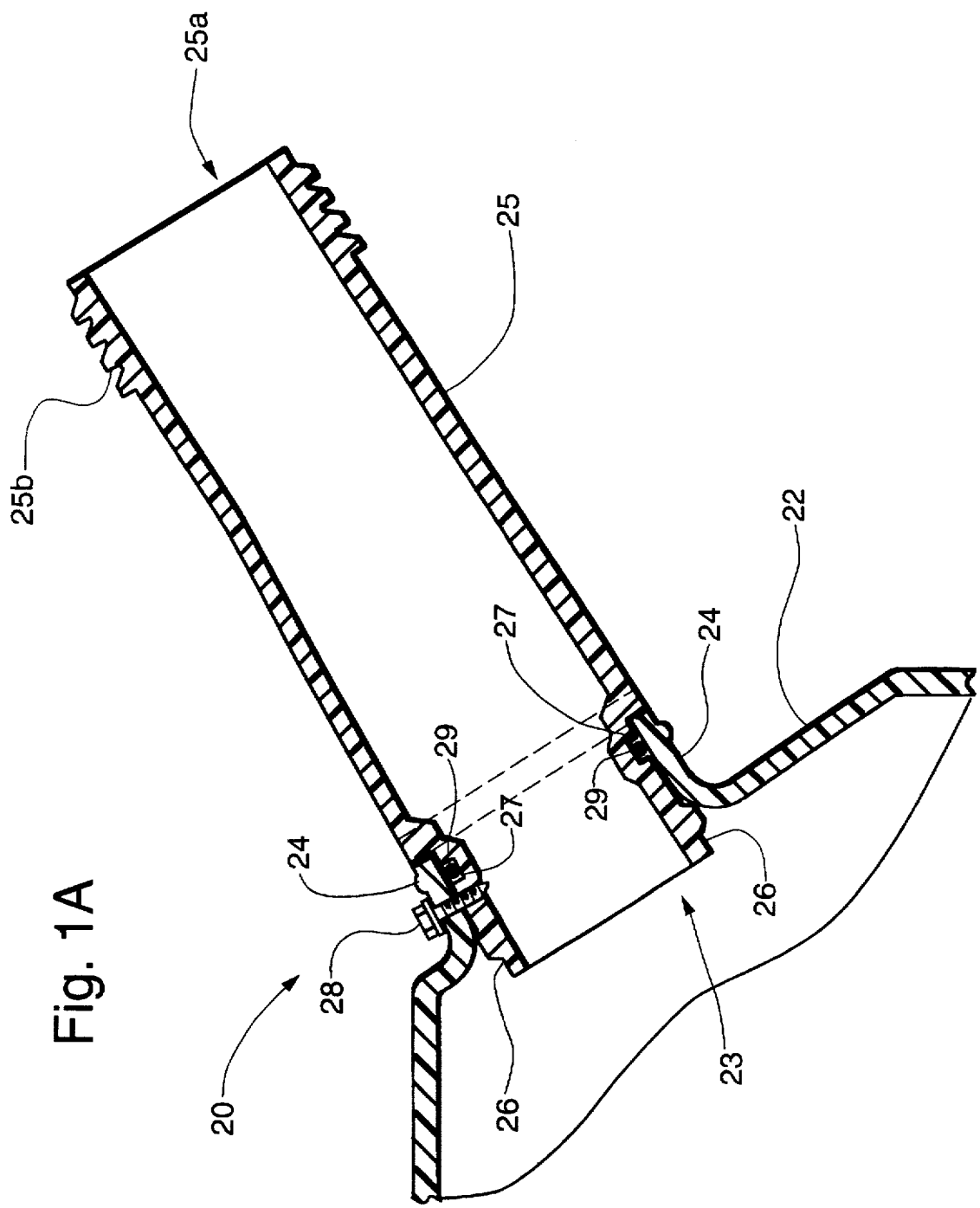
Figure 1C:
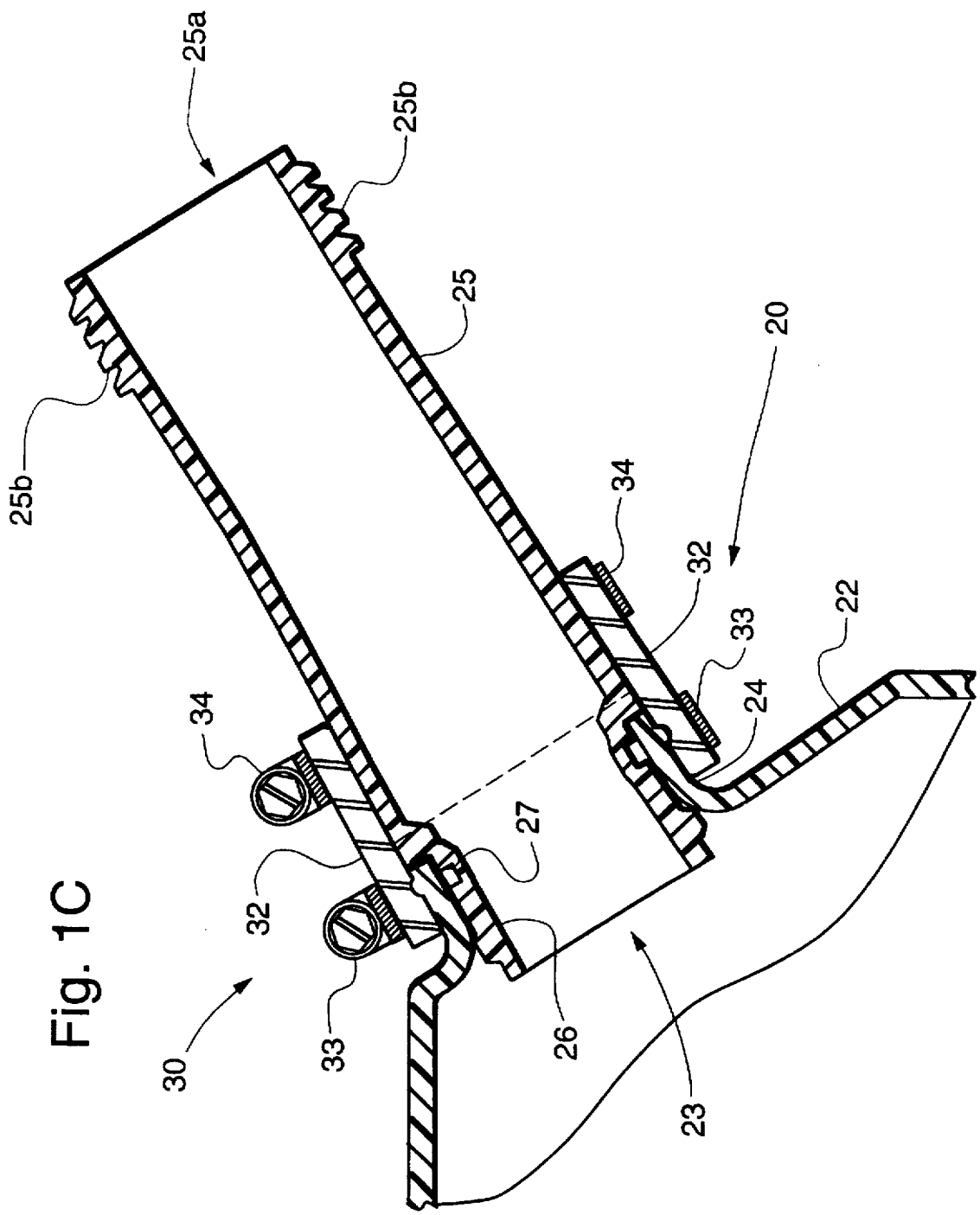
Figure 2:
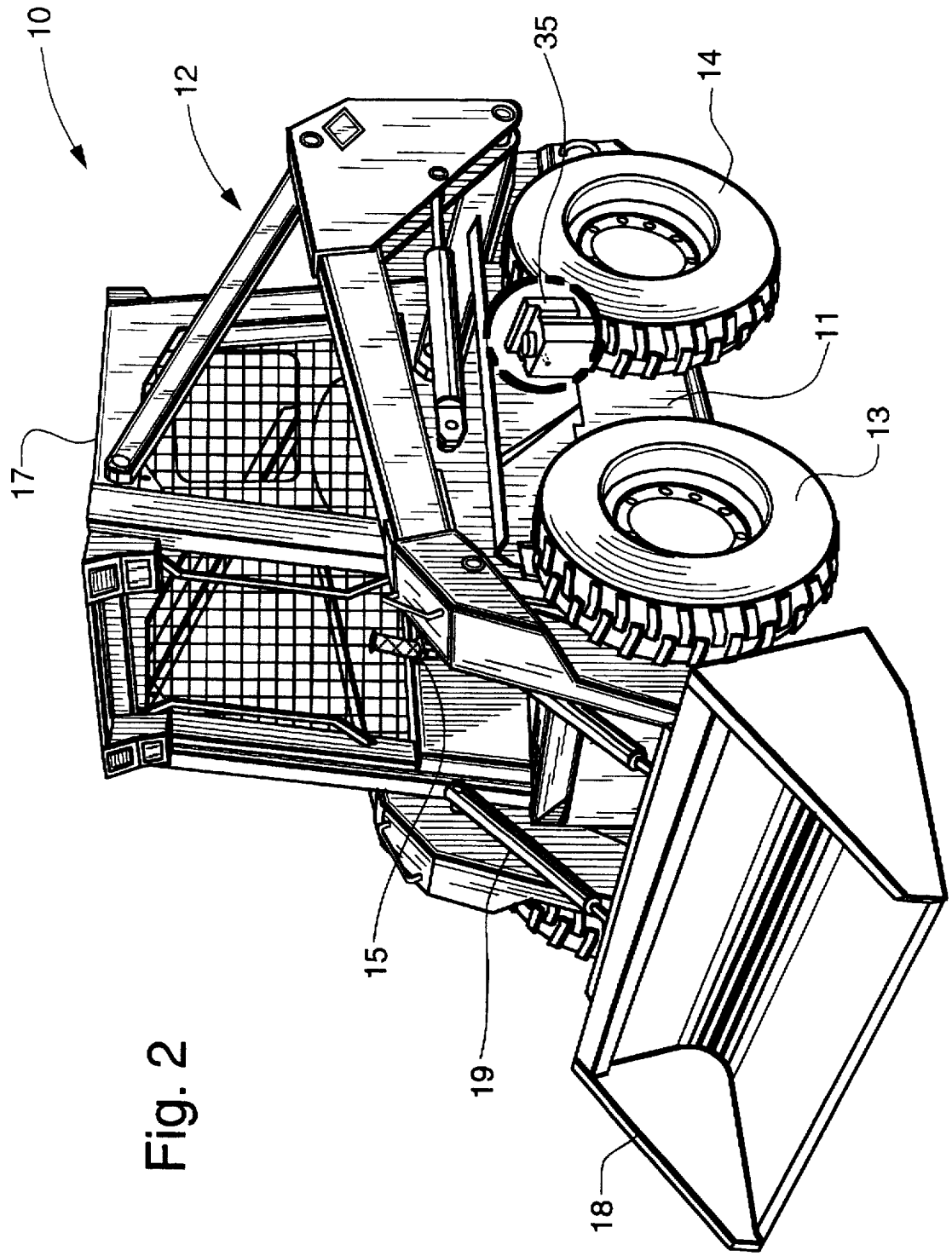
Figure 2A:
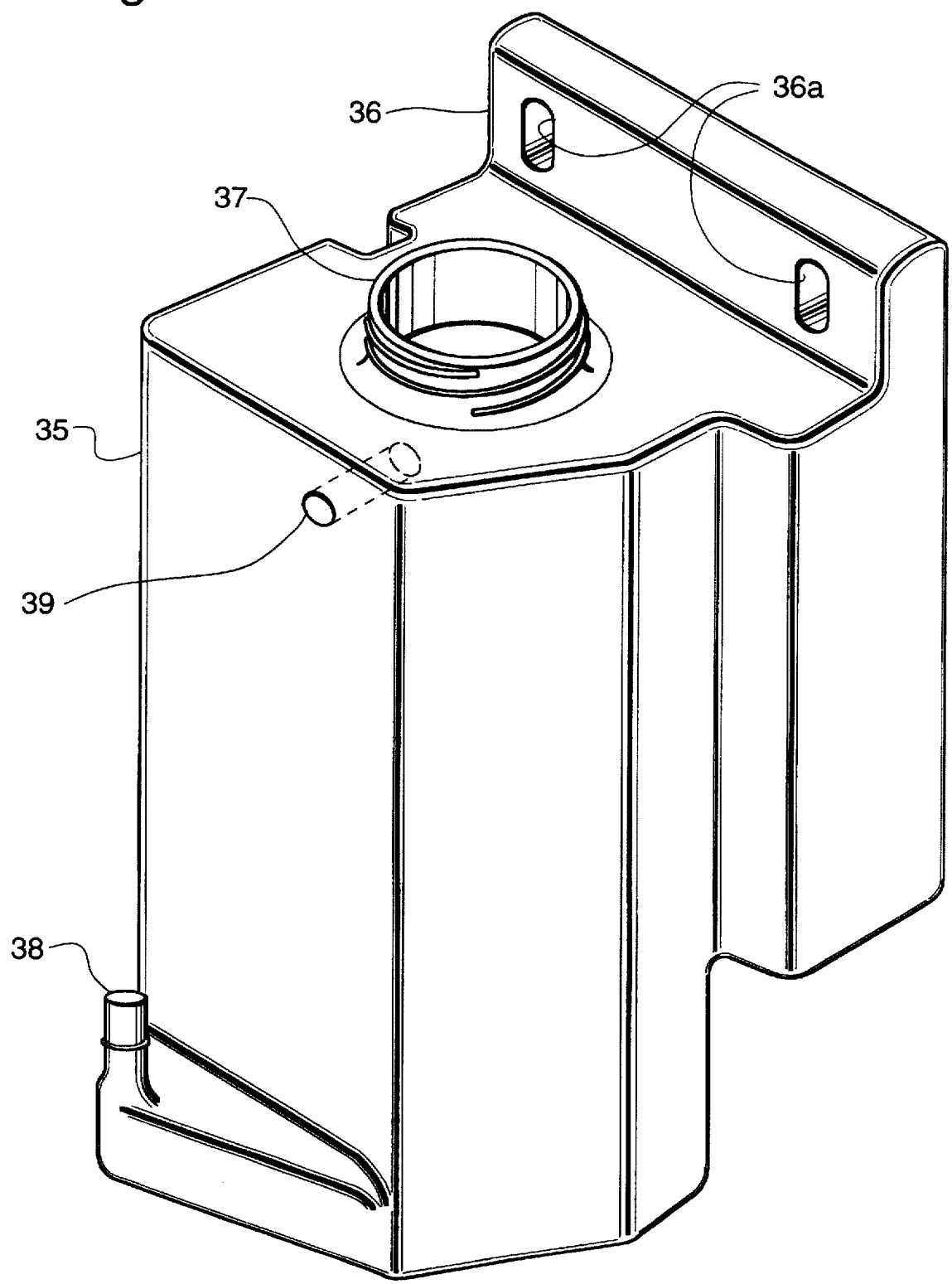
Figure 3:
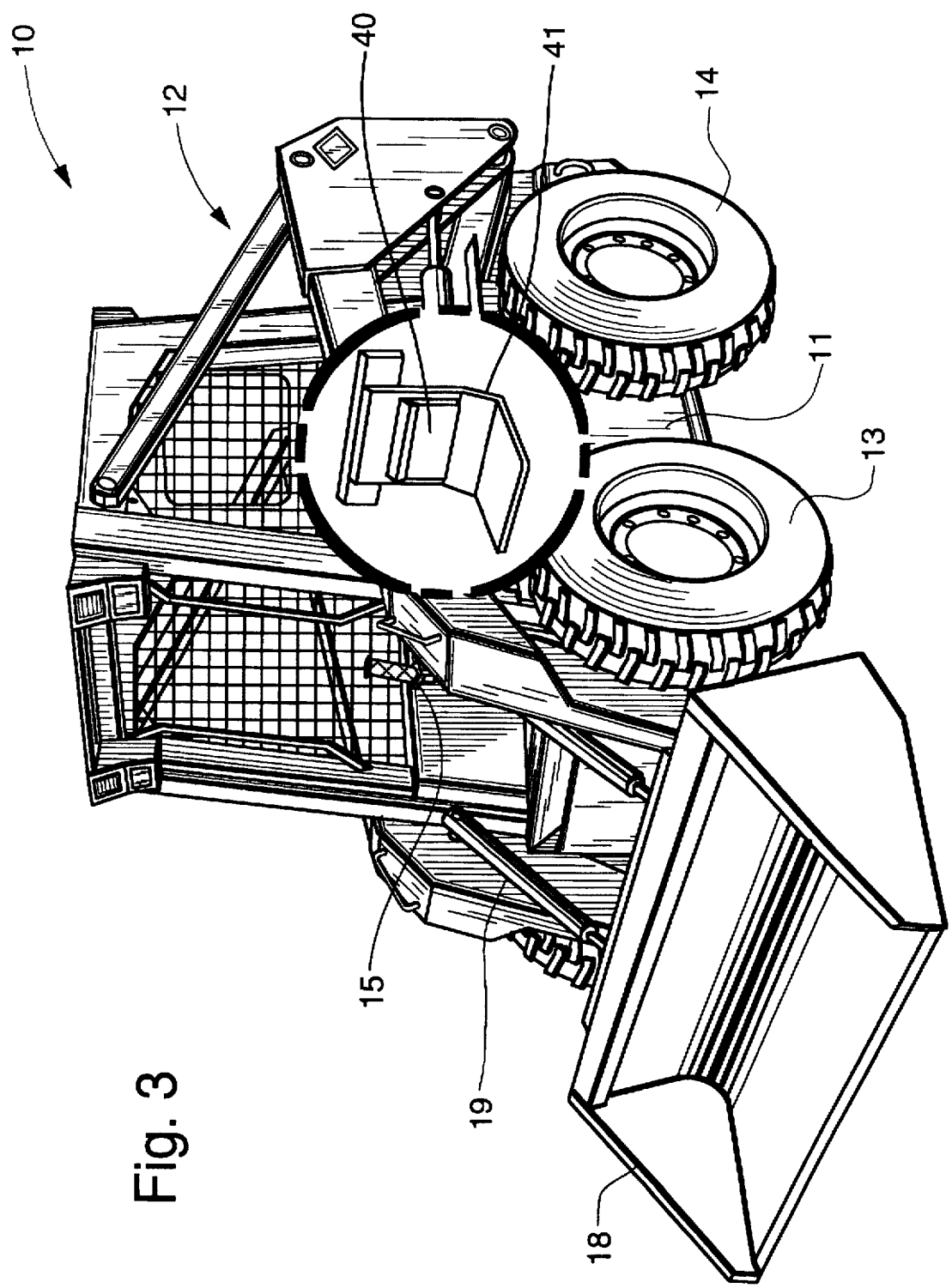
Figure 3B:
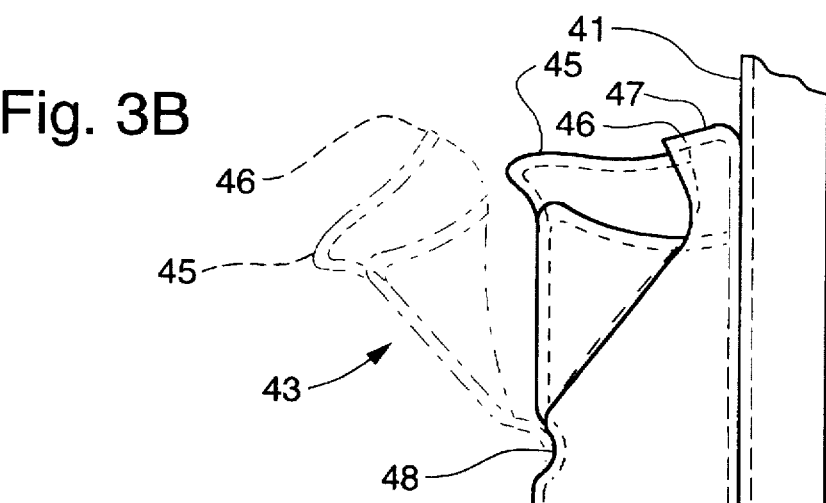
Figure 3C:
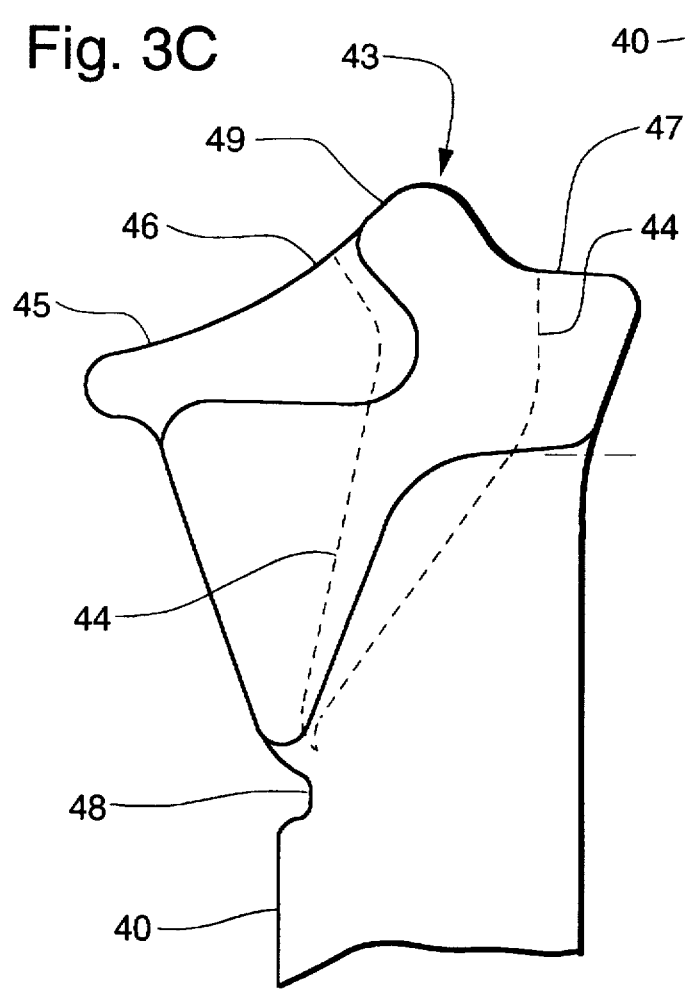
Figure 4:
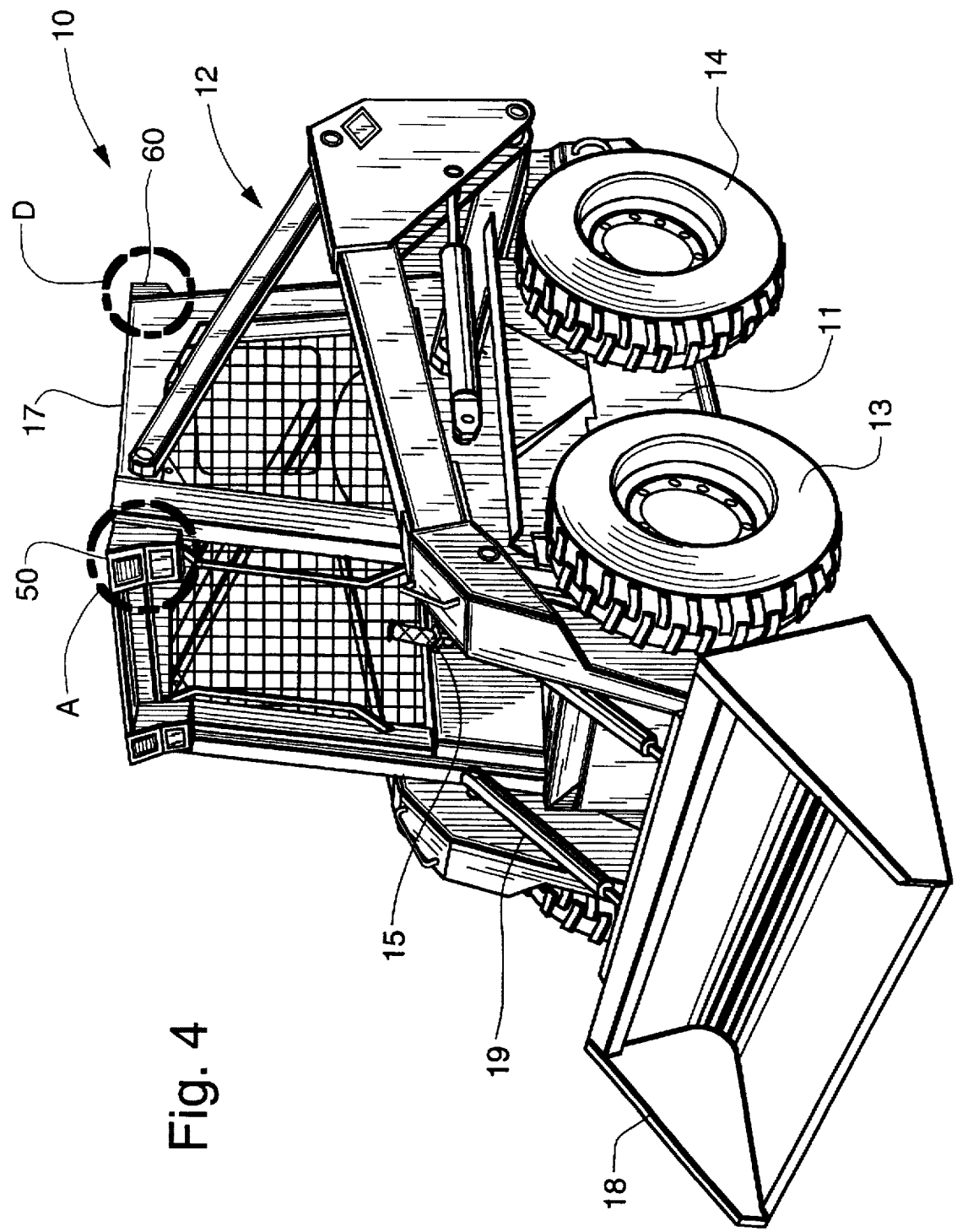
Figure 4A:
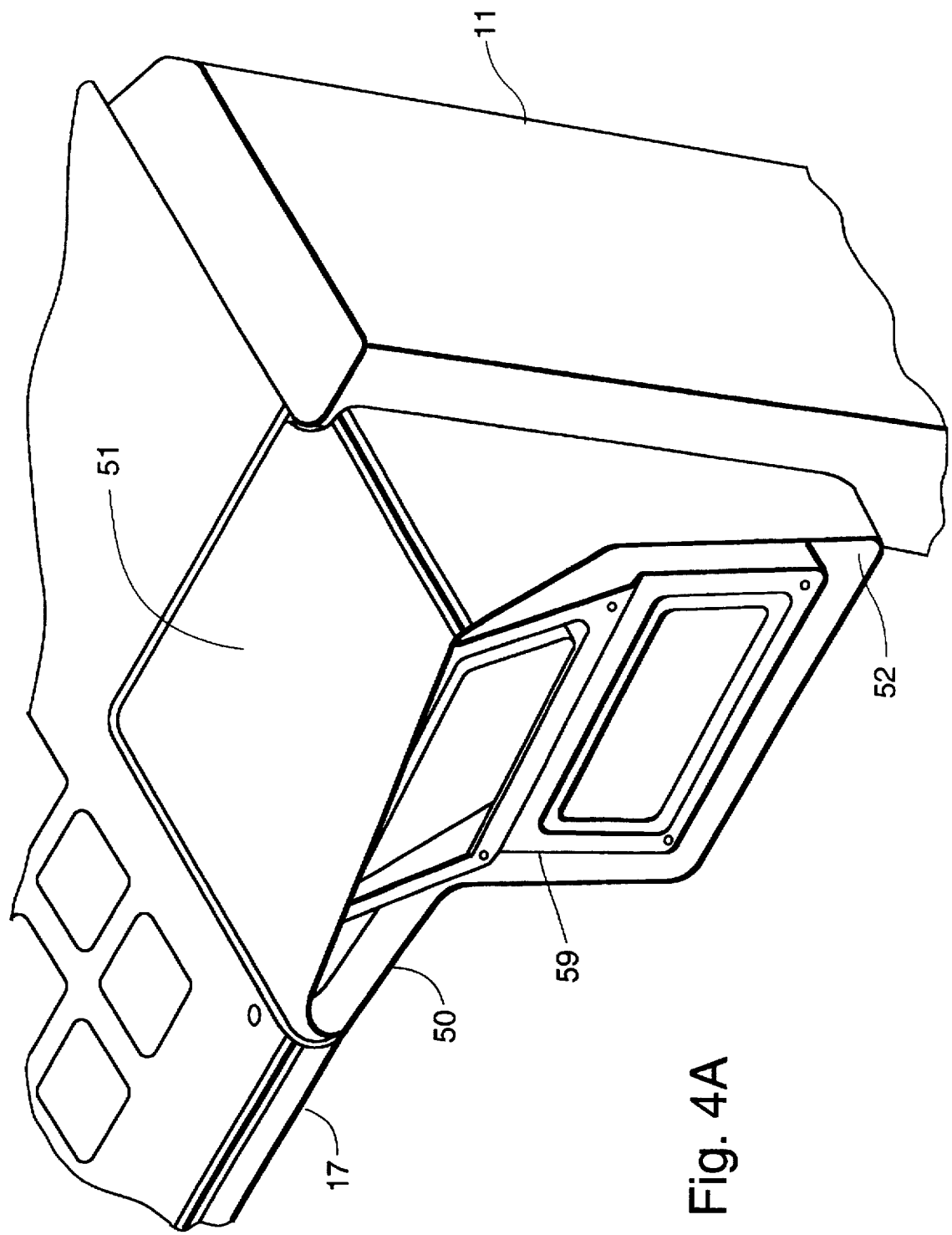
Figure 4C:
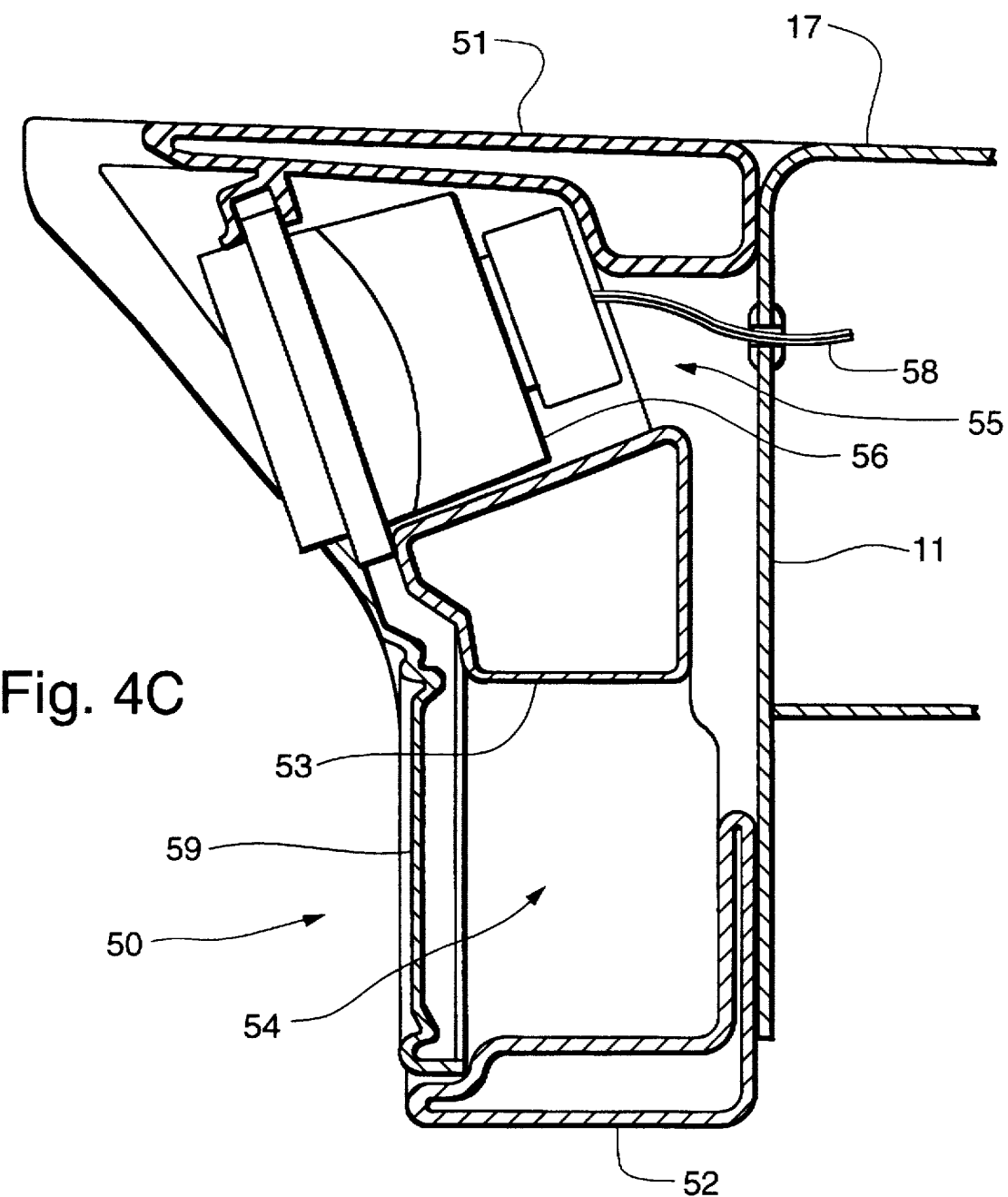
Figure 4D:
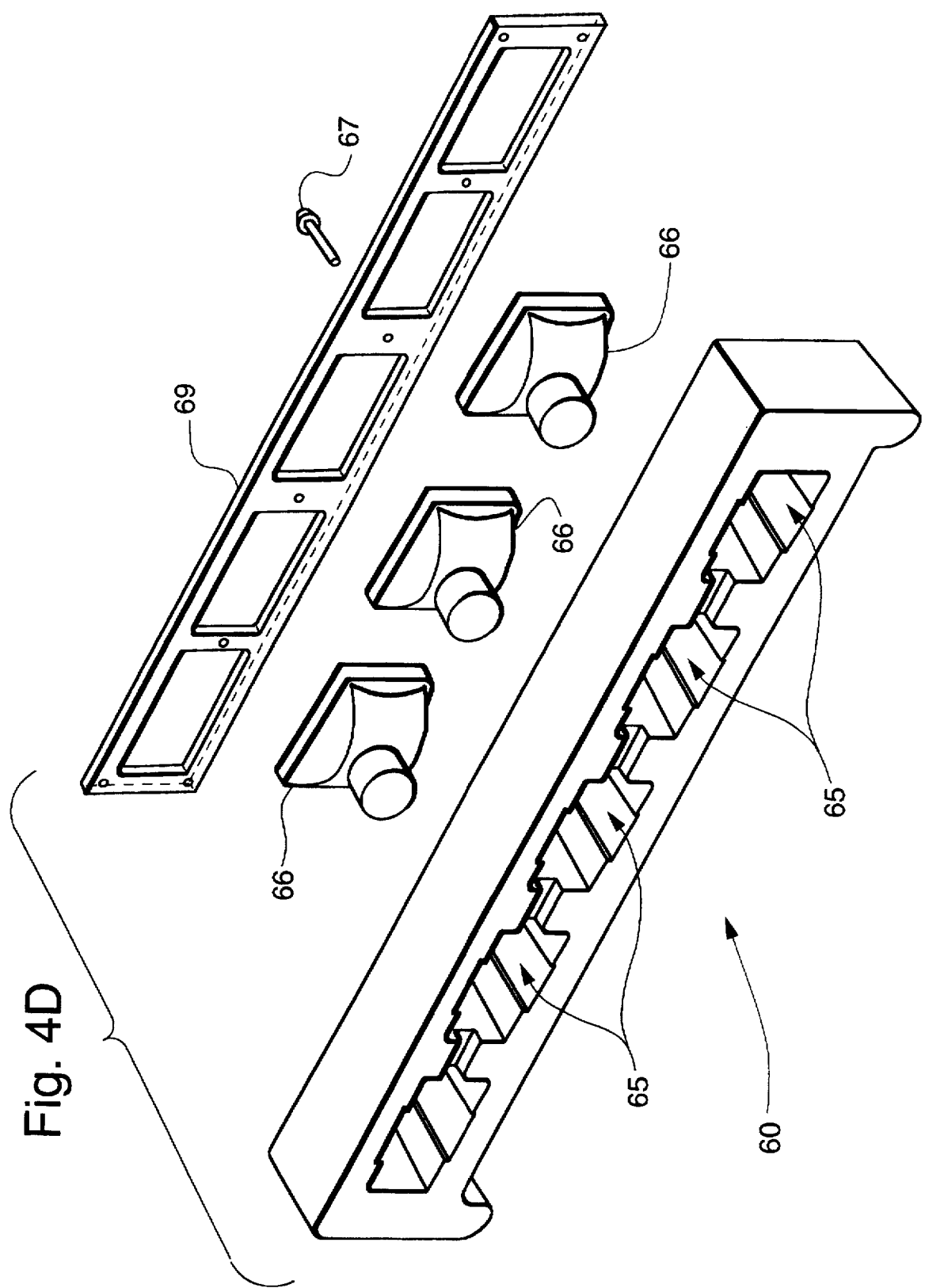
Figure 5:
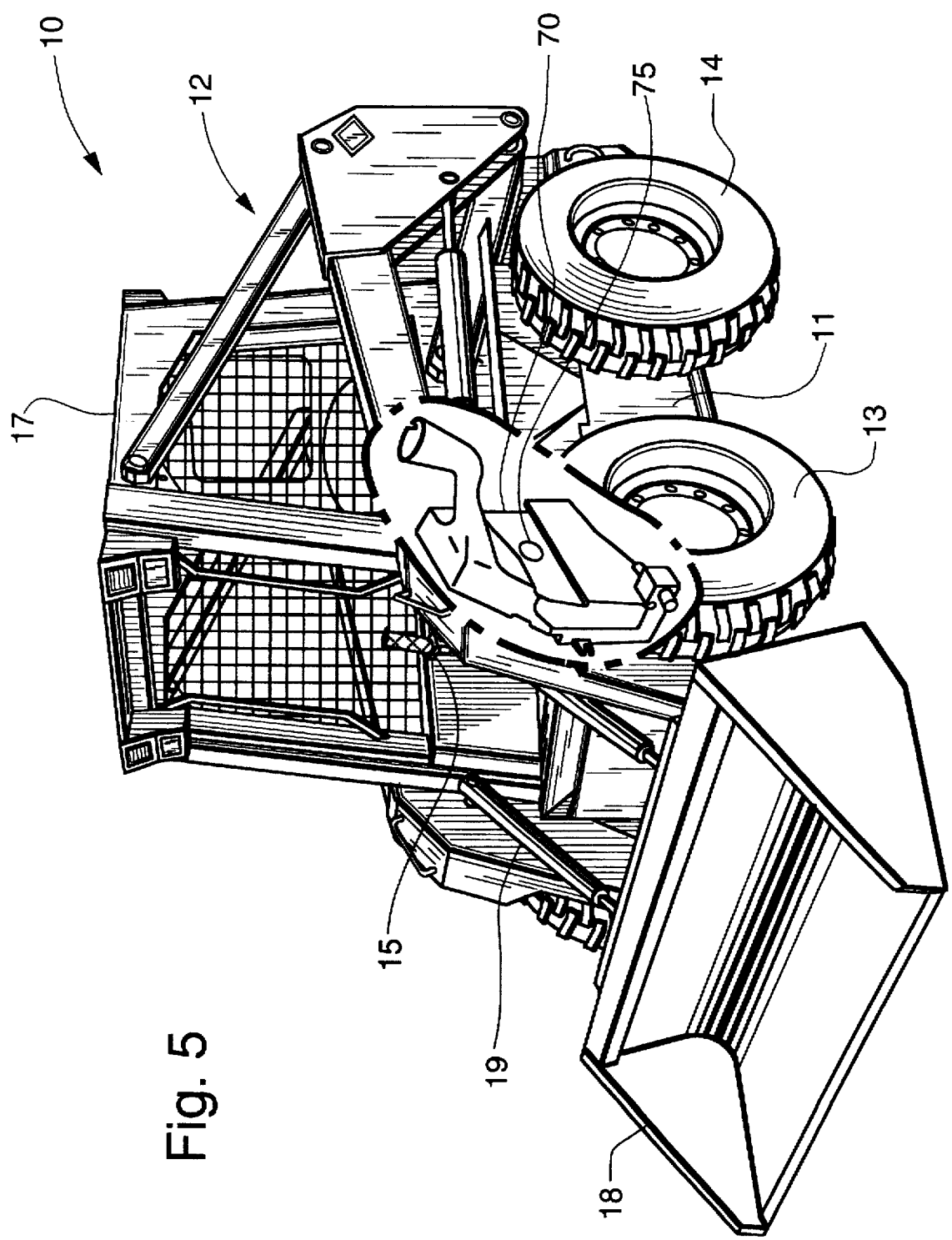
Figure 5A:
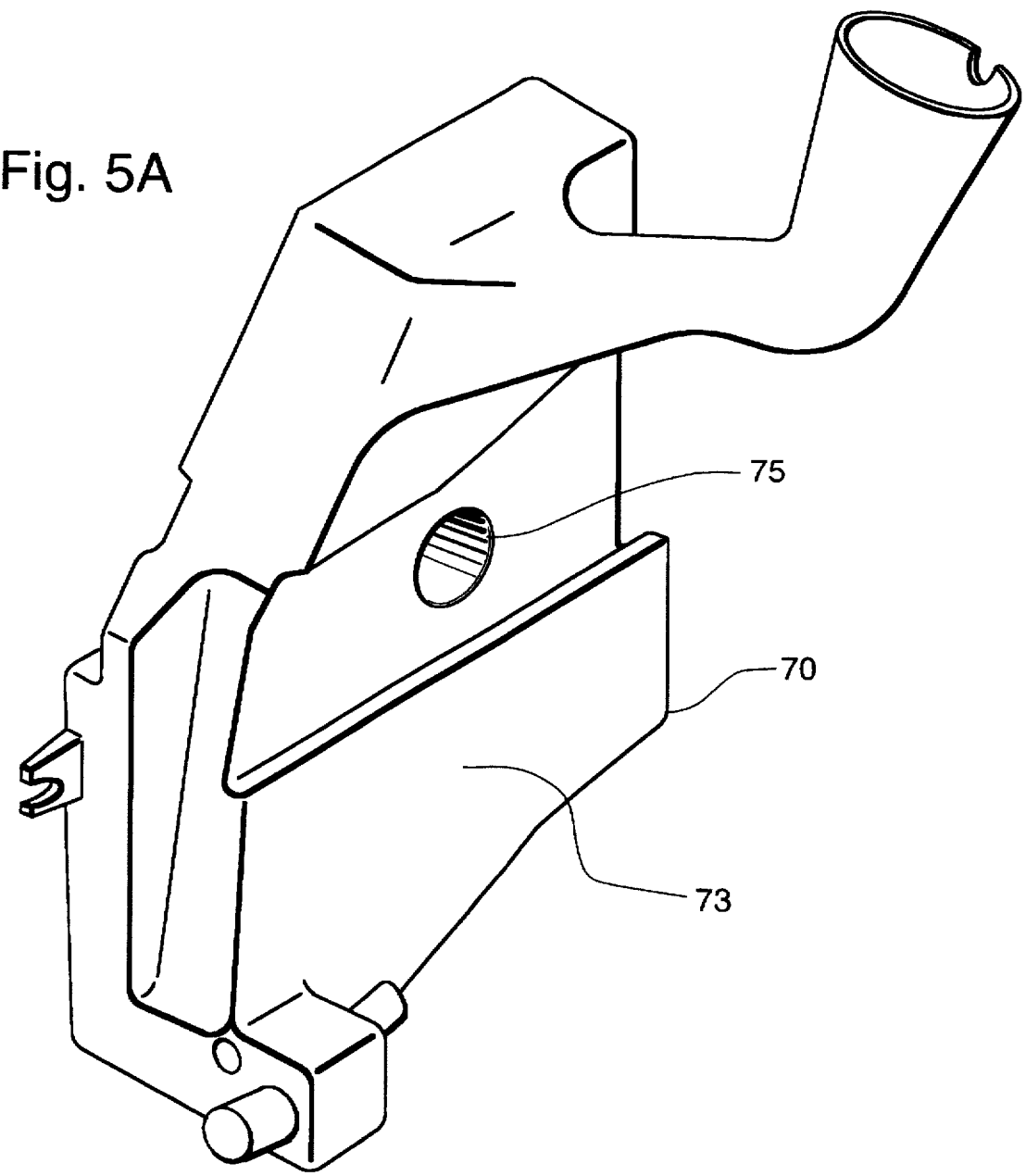
Figure 5C:
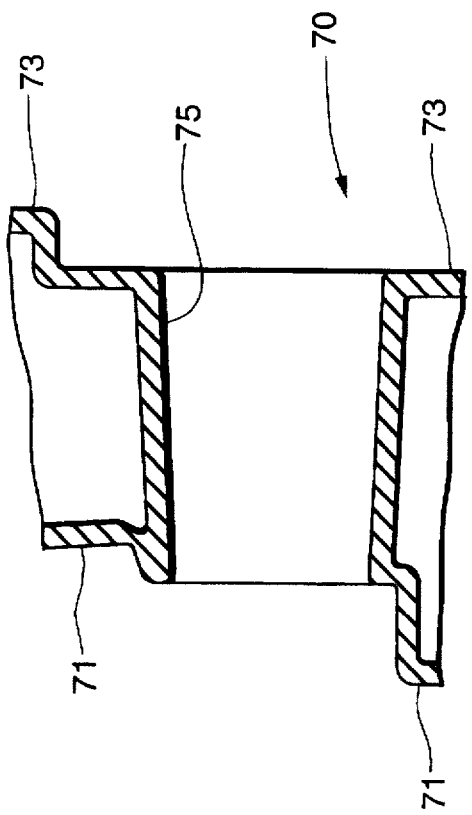
Figure 5B:
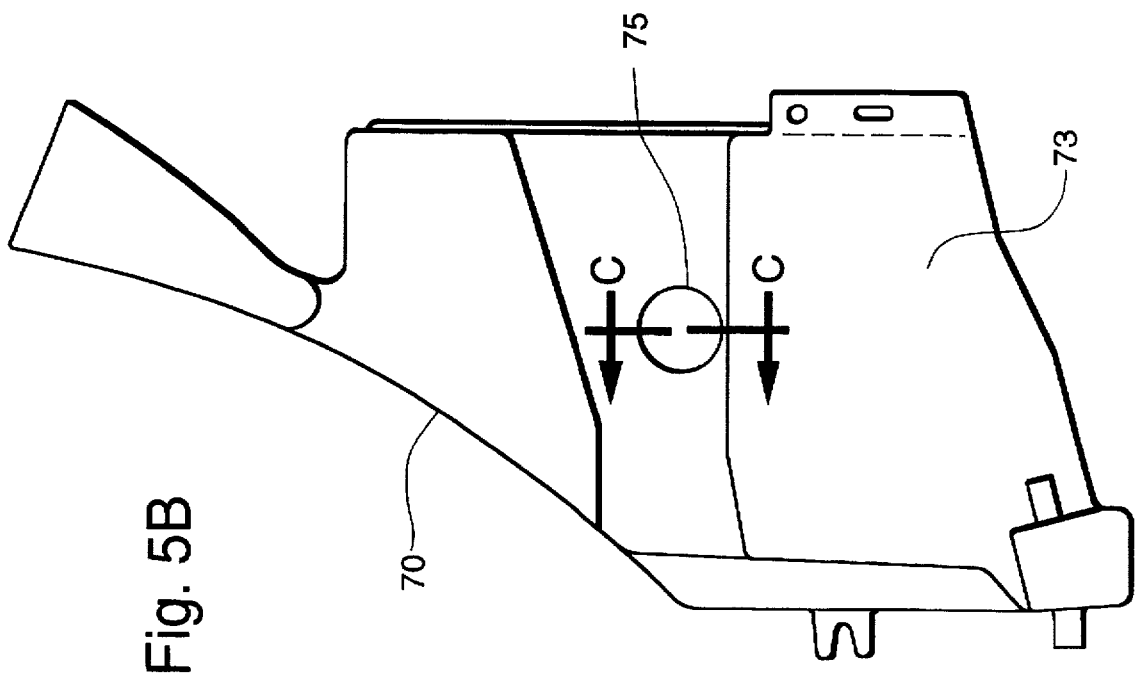

3 invention, especially when taken in conjunction with the accompanying drawings wherein:

FIG. 1 is a left, front perspective view of a skid steer loader incorporating the principles of the instant invention, a portion of the external structure of the skid steer loader being broken away to reveal the location of the fuel tank and filler tube formed from the rotational molding process;

FIG. 1A is a partial cross-sectional view of the fuel tank assembly depicting the connection of the filler tube to the fuel tank body to provide a liquid-tight connection therebetween;

FIG. 1B is a partial exploded view of the fuel tank assembly depicting the connection of the filler tube to the tank body corresponding to the embodiment of FIG. 1A;

FIG. 1C is a partial cross-sectional view of the fuel tank assembly depicting an alternative embodiment of the connection of the filler tube to the fuel tank body to provide a liquid-tight connection therebetween;

FIG. 1D is a partial exploded view of the fuel tank assembly depicting the alternative connection of the filler tube to the tank body corresponding to the embodiment of FIG. 1C;

FIG. 2 is a left, front perspective view of a skid steer loader incorporating the principles of the instant invention, a portion of the external structure of the skid steer loader being broken away to reveal the location of the coolant recovery bottle formed from the rotational molding process;

FIG. 2A is a perspective view of the coolant recovery bottle shown in FIG. 2;

FIG. 2B is a side elevational view of the coolant recovery bottle shown in FIG. 2A;

FIG. 2C is an enlarged partial cross-sectional view of the vent tube corresponding to circle C of FIG. 2B;

FIG. 3 is a left, front perspective view of a skid steer loader incorporating the principles of the instant invention, a portion of the external structure of the skid steer loader being broken away to reveal the location of the seat pan and the attached operator's manual container formed from the rotational molding process;

FIG. 3A is an enlarged left front perspective view of the skid steer loader seat pan and operator's manual container affixed thereto as depicted in FIG. 3;

FIG. 3B is an enlarged side elevational view of the operator's manual container with the movement of the lid being shown in phantom, portions of the seat pan being broken away for purposes of clarity;

FIG. 3C is an enlarged side elevational view of the top portion of the operator's manual container as ejected from the mold, the cut lines for forming the lid portion being shown in dotted lines;

FIG. 4 is a left, front perspective view of a skid steer loader incorporating the principles of the instant invention, the location of the front and rear light housings formed from the rotational molding process being encircled for purposes of clarity;

FIG. 4A is an enlarged perspective view of the front light housing corresponding to circle A in FIG. 4;

FIG. 4B is an exploded view of the front light housing;

FIG. 4C is an enlarged cross-sectional view of the front light housing shown in FIG. 4A;

FIG. 4D is an enlarged exploded view of the rear light housing corresponding to circle D in FIG. 4;

FIG. 4E is an enlarged cross-sectional view of the rear light housing shown in FIG. 4;

FIG. 5 is a left, front perspective view of a skid steer loader incorporating the principles of the instant invention, a portion of the external structure of the skid steer loader being broken away to reveal the location of the hydraulic reservoir tank formed from the rotational molding process;

FIG. 5A is an enlarged perspective view of the hydraulic reservoir tank shown in FIG. 5;

FIG. 5B is a side elevational view of the hydraulic reservoir tank shown in FIG. 5A; and FIG. 5C is an enlarged partial cross-sectional view of the kiss-off portion of the hydraulic reservoir tank corresponding to lines C—C of FIG. 5B.

DETAILED DESCRIPTION OF THE PREFERRED EMBODIMENT

Referring now to the drawings and, particularly, to FIGS. 1–5, a representative view of a skid steer loader incorporating the principles of the instant invention can best be seen. Any left and right references are used as a matter of convenience and are determined by standing at the rear of the skid steer loader and facing the forward end in the normal direction of travel. The skid steer loader 10 comprises a fixed wheeled vehicle having a frame 11, opposing pairs of front and rear wheels 13, 14 rotatably supported by the frame for movement over the ground.

As is conventional in such machines, the wheels 13, 14 of the skid steer loader 10 are rotatably driven by hydraulic motors (not shown) operatively powered from an engine 12 supported from the frame 11. Steering of the skid steer loader 10 is accomplished by differential driving of opposing left and right side wheels 13, 14 in a conventional manner through the use of a pair of control sticks 15. The frame 11 defines an operator's cab 17 in which the operator sits to maneuver the loader 10. A work implement, shown in FIGS. 1–5 as a bucket 18, is powered in a conventional manner by hydraulic cylinders 19 to locate the work function immediately forwardly of the operator's cab 17.

Referring now to FIGS. 1 through 1D, the fuel tank assembly 20 constructed according to the principles of the instant invention can best be seen. The fuel tank assembly 20 consists primarily of the fuel tank body 22 and the attached filler tube 25, both of which have been manufactured from the rotational molding process to define hollow bodies having a predetermined wall thickness. The tank body 22 is of a suitable shape to fit within the narrow confines between the frame 11 and the engine 12 and is rotationally molded to define an inlet opening 23 and a fuel line opening (not shown) near the bottom of the tank to withdraw fuel therefrom in a conventional manner for use by the engine 12.

The inlet opening 23 is located near the top of the tank body 22 for obvious reasons and is defined by a flange 24 projecting outwardly from the tank body 22. As with all other portions of the tank body, and all other rotationally molded parts, the flange 24 is formed during the manufacturing process and is an integral part of the tank body 22. The filler tube 25 is a hollow cylindrical member having an opening an opposing ends to form a conduit for the introduction of fuel into the tank body 22. The filler tube 25 includes a neck 26 having an outside diameter substantially equal to the inside diameter of the flange 24 defining the inlet opening 23 so that the filler tube 25 can fit snugly into the flange 24. The outside diameter of the filler tube 25 is preferably of the same outside diameter and shape of the flange 24 so as to give the appearance of a continuous extension of the flange 24.

As depicted in the preferred embodiment of FIGS. 1A and 1B, the neck 26 of the filler tube 25 and the flange 24 is formed with a groove 27 to fit an O-ring 29 positioned within the groove 27 and compressed between the flange 24 and the neck 26 to prevent leakage of fuel therebetween. A self-tapping screw 28 extends through a suitable hole formed in the flange 24 and neck 26 to prevent the filler tube 25 from separating from the tank body 22. Preferably, the filler tube 25 adjacent the inlet opening 25a is provided with threads 25b to permit engagement of a fuel cap (not shown) for sealing off the fuel tank assembly 20 when fuel is not being introduced into the fuel tank body 22.

An alternative embodiment of the connection between the filler tube 25 and the tank body 22 is depicted in FIGS. 1C and 1D. As previously described, the filler tube 25 includes a neck 26 that snugly fits within the flange 24 to mate thereagainst. Instead of using the screw 28 and O-ring 29, the filler tube 25 is fixed to the flange 24 by a clamping apparatus 30 consisting of a rubber sleeve 32 and a pair of hose clamps 33, 34. The first hose clamp 33 compresses the rubber sleeve 32 against the outside diameter of the flange 24, while the second hose clamp 34 compresses the rubber sleeve 32 against the filler tube 25. As a result, the joint between the filler tube 25 and the flange 24 is sealed externally, rather than internally by the O-ring 29, although the O-ring 29 could still be utilized, and the clamping apparatus 30 provides a positive clamping force to affix the filler tube 25 to the tank body 22.

Referring now to FIGS. 2 through 2C, the coolant recovery bottle 35 constructed according to the principles of the instant invention can best be seen. As with the fuel tank assembly 20, the coolant recovery bottle 35 is manufactured with a rotational molding process in which a mold (not shown) is constructed to conform to the desired shape of the bottle 35. A predetermined amount of powdered resin in poured into the mold and rotated and heated to form the hollow bottle 35 having a mounting flange 36 with holes 36a therethrough for the passage of fasteners (not shown) to mount the bottle 35 to the frame 11 of the loader 10, a threaded inlet opening 37 for the introduction of coolant into the bottle 35, an connecting line opening 38 for the connection of a line (not shown) from the engine radiator (not shown).

To vent the bottle 35 to the atmosphere, as is necessary for coolant recovery bottles 35, the recovery bottle 35 is also formed with an internal vent 39 projecting inwardly into the interior of the bottle 35. Since formed as part of the rotational molding process, the interior vent 39 is an integral part of the bottle 35 structure. By reason of the vent 39 extending substantially perpendicular to the major axis of the bottle 35 and projecting a substantial distance into the interior of the bottle 35, the vent 39 is substantially spill-proof. Coolant splashing around within the interior of the bottle will generally be at a level substantially lower than the vent 39 and, as a result, will usually be directed away from the perpendicular axis of the vent 39 to prevent the external spillage of the coolant through the vent 39.

Referring now to FIGS. 3 through 3C, the operator's manual container 40 constructed according to the principles of the instant invention can best be seen. The operator's manual is occasionally needed by the operator of the skid steer loader 10 while at a remote location. To keep the operator's manual clean and dry, the skid steer loader 10 is equipped with a operator's manual container 40 positioned behind the seat (not shown) which is mounted on a seat pan 41 to permit positional adjustment of the seat (not shown) relative to the frame 11. The operator's manual container 40 is affixed to the seat pan 41 immediately behind the seat (not shown) for convenient access by the operator.

Referring specifically to FIGS. 3B and 3C, the operator's manual container 40 is constructed with the rotational molding process as a hollow body. The top portion 43 of the container 40 is formed with a specific shape, as best seen in FIG. 3C, with cut lines 44 to define the discard portion 49 of the container 40. After the discard portion 49 is cut away from the molded container 40, a lid member 45 is defined with an upturned lip 46 that is depressible beneath the latch surface 47 to restrain the movement of the lid member 45. During the creation of the mold, an indent edge was inserted at a location corresponding to the lower edge of the lid member 45. As a result, the container 40 is formed with a linear portion 48 along the lower edge of the lid portion with a material thickness that is slightly less than the rather uniform thickness of the rest of the container 40. This linear portion 48 forms a live hinge that enables the lid member 45 to be rotated away from the container 40, as depicted in phantom in FIG. 3B.

Referring now to FIGS. 4 through 4E, the front and rear light housings constructed according to the principles of the instant invention can best be seen. The front light housing 50, depicted in FIGS. 4A through 4C, is formed with a double wall construction at the top 51 and bottom 52 to provide additional strength and resistance to damage from impact. A central member 53 divides the housing into a lower light chamber 54 and an upper light chamber 55, both of which are open to the front of the housing 50. A light 56 can be mounted in either light chamber 54, 55 and restrained in place by a bezel 59 detachably affixed by fasteners, representatively shown at 57, to the housing 50. Electrical wires 58 can pass through a suitable opening formed within the housing 50 to pass through the frame 11 of the loader 10.

Referring specifically to FIGS. 4D and 4E, the rear light housing 60 can be formed as an elongated member extending substantially the entire width of the loader along the rear of the frame 11. The rear light housing 60, like the front light housing 50, includes a double wall construction and defines a plurality of horizontally disposed light chambers 65 open to the rear of the housing 60 away from the frame 11. Lights 66 can be selectively mounted in appropriate light chambers 65 to provide the desired rear lighting effects. A rear bezel 69 is detachably affixed to the rear light housing 60 by fasteners, representatively shown at 67, to retain the lights 66 in the corresponding light chamber 65.

Because of their double wall construction, the front and rear light housings 50, 60 provide bumpers or corner protectors to protect the frame 11 of the skid steer loader 10 from damage from impact. The location of the front light housings 50 at the respective upper front corners of the operator's cab 17 and of the rear light housing along the rear of the operator's cab 17 protects the cab 17 and the frame 11 from damage from impact. The double walled housings 50, 60 absorb impact and damage resulting therefrom to prevent the impact from reaching and damaging the cab 17 or frame 11.

Referring now to FIGS. 5 through 5C, the details of the hydraulic reservoir tank 70 constructed according to the principles of the instant invention can best be seen. The hydraulic reservoir tank 70 stores hydraulic fluid for the entire hydraulic system of the skid steer loader 10. Since the loader 10 is driven through hydraulic motors (not shown) and is operatively powered through hydraulic cylinders 19, the hydraulic reservoir comprises a substantial volume of hydraulic fluid. This reservoir of hydraulic fluid is stored in the reservoir tank 70, which is confined within the frame 11 of the loader 10.

Due to the unique shape of the hydraulic reservoir tank 70, as best seen in FIG. 5A and the substantial volume that must be contained within the tank 70, the opposing lateral sides 71, 73 off the tank are quite expansive in size. To prevent the lateral sides 71, 73 of the tank 70 from bulging with the weight of the hydraulic fluid stored within the tank 70, the tank 70 is formed with an integral kiss-off member 75 interconnecting the opposing sides 71, 73 and adding rigidity to the tank structure 70. Since the kiss-off member 75 is formed as part of the rotational molding process, as best seen in FIG. 5C, the kiss-off member 75 is an integral part of the tank and will not separate from the opposing lateral walls 71, 73.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In an off-road vehicle having a wheeled frame adapted for movement over the ground; an engine supported by said frame to provide operative power for said vehicle; and a fuel tank assembly for storing a supply of fuel for use by said engine, an improved fuel tank assembly comprising:

a molded polymer, hollow tank body having a inlet opening for the introduction of fuel into said tank body, said tank body including a flange extending outwardly from said tank body and defining said inlet opening;

a molded polymer filler tube detachably fastened to said tank body at said inlet opening to form a joint therebetween, said filler tube extending outwardly from said tank body to direct fuel from a remote location into said inlet opening, said filler tube being formed with a neck having a shape corresponding to the shape of said flange and being sized to fit inside said flange to extend into said inlet opening, said filler tube being self supporting;

means for sealing said joint between said filler tube and said tank body to prevent the passage of fuel therebetween; and a self-tapping screw interengaged between said flange and said neck of said filler tube for detachably connecting said filler tube to said tank body.

2. The vehicle of claim 1 wherein said neck includes an annular groove formed therein, said sealing means further including an O-ring located within said groove to be compressed between said neck and said flange to seal said joint therebetween.

3. A fuel tank assembly for use on a skid steer loader having a wheeled frame adapted for movement over the ground and an engine supported by said frame to provide operative power for said vehicle, comprising:

a molded polymer, hollow tank body, said tank body including a flange projecting outwardly therefrom and defining an inlet opening for the introduction of fuel into said tank body;

a molded polymer filler tube being engageable with said flange to form a joint therebetween, said filler tube including a neck having a shape and size to fit snugly within the inner circumference of said flange, said filler tube having an outside diameter adjacent to said flange, said filler tube outside diameter being substantially identical to the outside diameter of said flange to provide the appearance of said filler neck tube providing a smooth extension from said flange, said filler tube being self supporting;

a self-tapping screw interconnecting said neck of said filler tube and said flange to detachably connect said filler tube to said flange and to seal said joint therebetween; and an O-ring positioned within a groove formed in said neck to be compressed between said neck and said flange to seal said joint therebetween.

* * * * *